O. N. TEVANDER & A. MANIERRE.
APPARATUS FOR MODIFYING THE SIZE OF FASTENING ELEMENTS.
APPLICATION FILED JAN. 14, 1911.
1,078,705.
Patented Nov. 18, 1913.
3 SHEETS—SHEET 1.
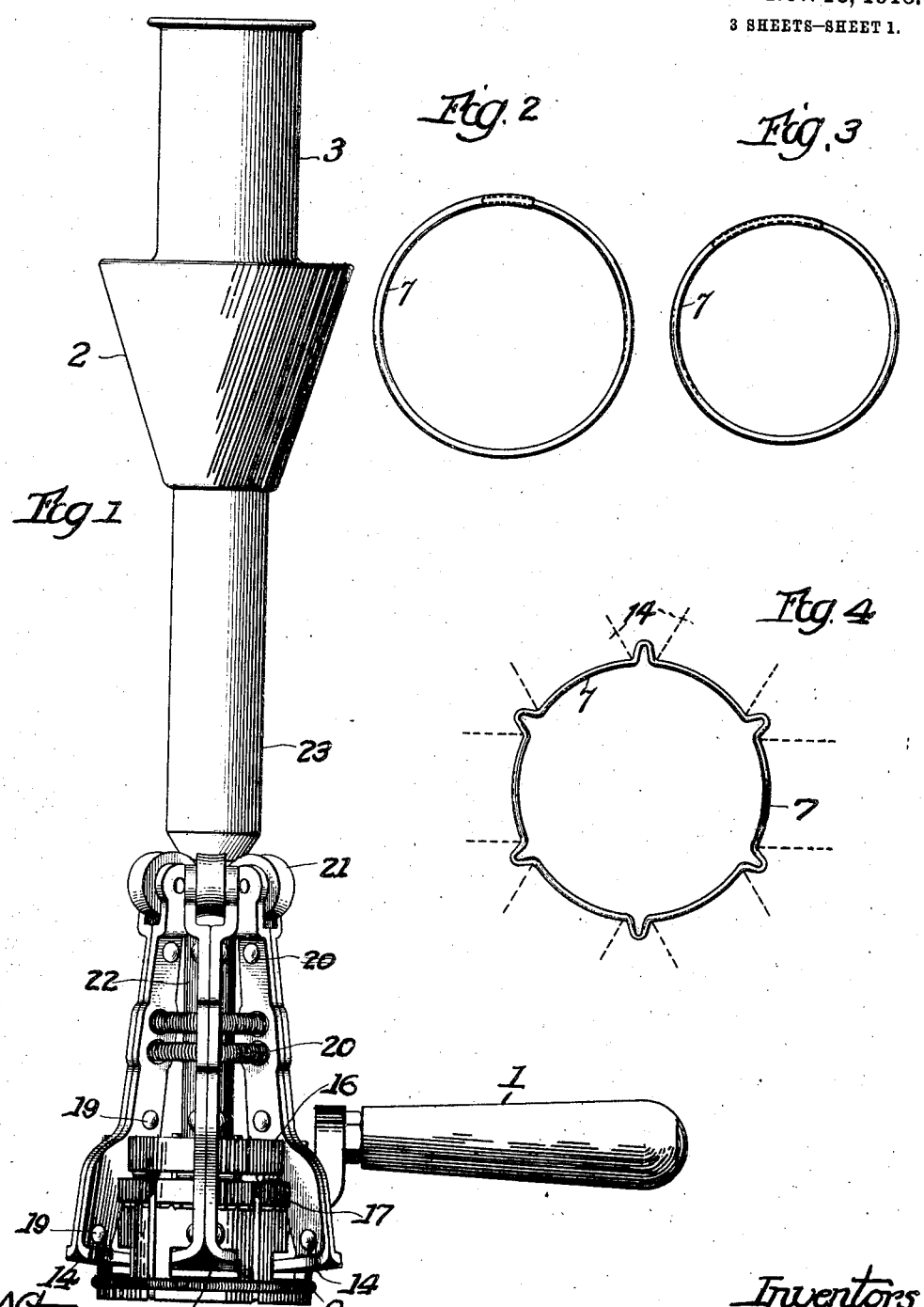

O. N. TEVANDER & A. MANIERRE.
APPARATUS FOR MODIFYING THE SIZE OF FASTENING ELEMENTS.
APPLICATION FILED JAN. 14, 1911.
1,078,705.
Patented Nov. 18, 1913.
3 SHEETS—SHEET 2.
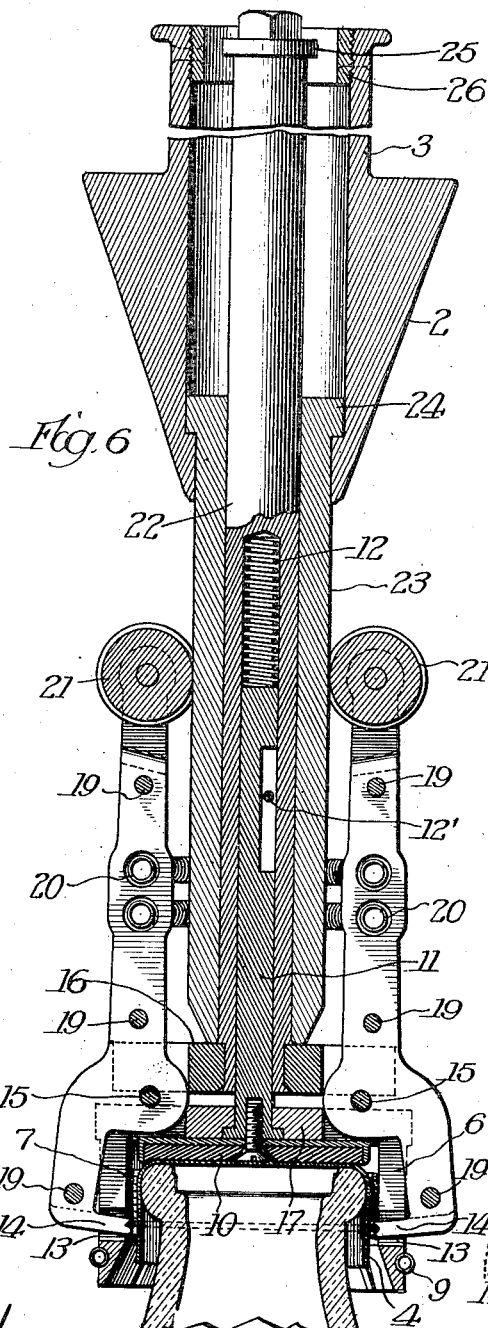
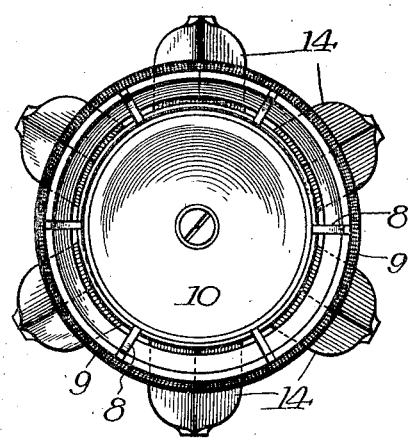
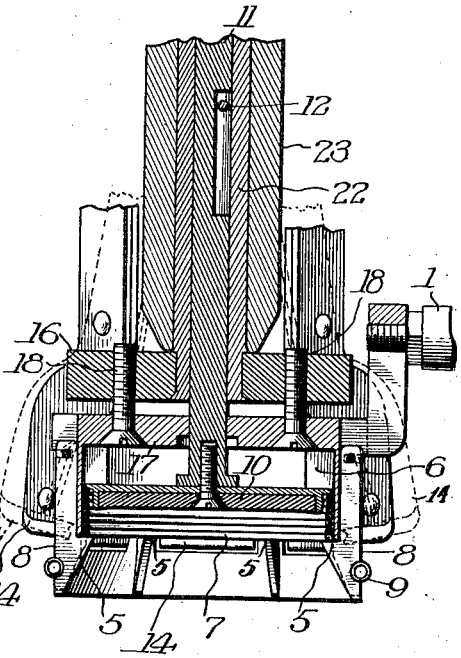

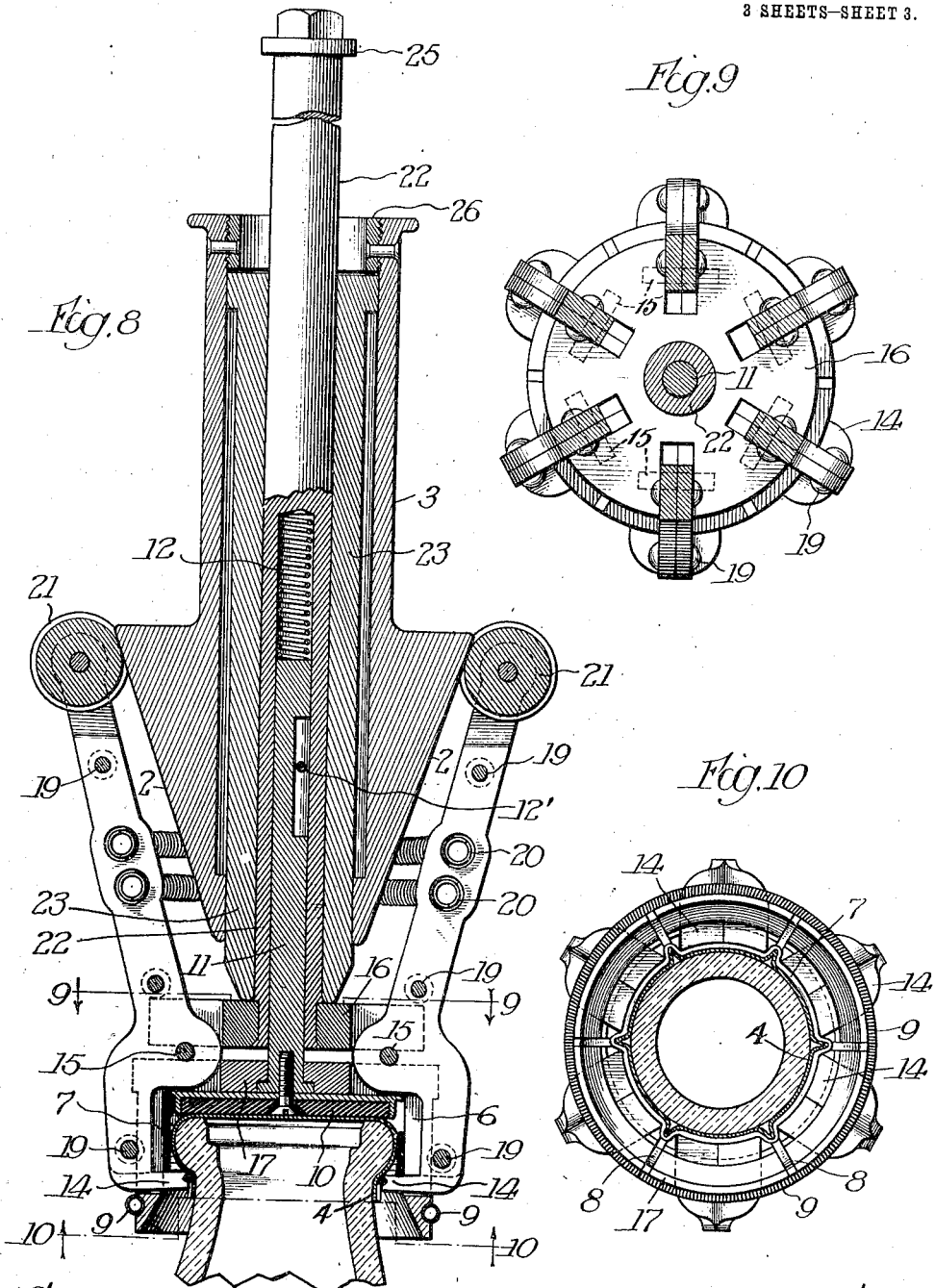

UNITED STATES PATENT OFFICE.

OLOF N. TEVANDER AND ARTHUR MANIERRE, OF CHICAGO, ILLINOIS.

APPARATUS FOR MODIFYING THE SIZE OF FASTENING ELEMENTS.

1,078,705.  Specification of Letters Patent.  Patented Nov. 18, 1913.

Application filed January 14, 1911. Serial No. 602,674.

*To all whom it may concern:*

Be it known that we, OLOF N. TEVANDER and ARTHUR MANIERRE, citizens of the United States, residing at Chicago, in the county of Cook and State of Illinois, have invented a certain new and useful Improvement in Apparatus for Modifying the Size of Fastening Elements, of which the following is a full, clear, concise, and exact description, reference being had to the accompanying drawings, forming a part of this specification.

Our invention relates to apparatus for modifying the size of fastening elements and is of particular service in contracting the size of clamping rings that are placed about the skirts of closure caps employed for sealing milk bottles, such rings for example as are disclosed in our co-pending application 566,580, filed June 13, 1910. We do not wish to be limited, however, to the use to which our invention is put nor to the precise manner in which the sizes of the clamping rings are modified, nor in fact do we wish to be limited to clamping rings as the fastening elements upon which our machine may work since the machine of our invention has wide application.

The product herein disclosed forms the subject matter of a co-pending application Serial No. 566,580, filed June 13, 1910.

The accompanying drawings show the preferred embodiment of our invention as it may be employed in connection with the article disclosed in our aforesaid application but we do not limit ourselves to this precise embodiment of our invention even when it is employed in connection with the precise method specifically disclosed in our said patent.

In the drawings, Figure 1 is a view in elevation of one form of our machine; Fig. 2 illustrates one form of ring that constitutes one of the types of fastening elements upon which the machine of our invention may operate to change its size; Fig. 3 shows another size of the same ring illustrated in Fig. 2, the rings shown in these figures having telescoping ends that are in sliding relation to permit their size to be altered; Fig. 4 illustrates another type of ring that does not have ends in telescoping relation, the size of the ring shown in this figure being modified by crimping; Fig. 5 is a view in sectional elevation of the lower part of the mechanism showing the relative positions of the parts before the bottle, receptacle or other device to which the fastening element is to be applied, is located in position to have the machine operate upon the fastening element; Fig. 6 shows the machine in sectional elevation with the bottle in position, the parts being illustrated in the positions they occupy before the fastening element is applied to the bottle; Fig. 7 shows the bottom of the structure as it appears in Fig. 6, the bottle being absent; Fig. 8 shows the positions the parts occupy after the fastening element has been applied to the skirted closure located about the bottle mouth; Fig. 9 is a sectional view on line 9—9 of Fig. 8; and Fig. 10 is a sectional view on line 10—10 of Fig. 8.

Like parts are indicated by similar characters of reference throughout the different figures.

The machine shown is a portable machine, to which the invention is not to be limited however, a handle 1 being gripped by the left hand while a spreading cone shaped plunger 2 is engaged at its shank extension 3 by the right hand. The rings that are to be applied to the bottle neck and the skirt 4 of the bottle closure are supported upon the bottom ledge 5 of a magazine or container which has a cylindrical wall 6 that surrounds the rings or bands that are indicated at 7. The bottom ledge of the magazine constitutes a ring support and is desirably formed by the inwardly projecting hooks upon the lower ends of pivoted or swingingly mounted members 8, these hooks being spring pressed inwardly by a coil spring 9 that will yield to permit the hooks 8 to spread when the magazine is to hold the fastening rings. A follower 10 may, if desired, be employed for resting upon the pile of rings within the magazine to insure the proper descent thereof, this follower desirably having a stem 11 which is pressed upon by a spring 12 to assist gravity in causing the follower to remain upon the pile of rings as the bottom rings are removed one by one in the operation of the machine. A pin 12¹ acts as a stop to fix the limit to which the follower may descend. The wall of the magazine 6 is provided with six perforations 13 that are distributed around the same in the plane of the lowermost ring 7 in the magazine, these openings 13 having vertical dimensions that are considerably in excess of the thickness of which the rings 7 are made so as to permit of the entry of holding jaws 14 within the magazine, which holding jaws are employed for the purpose of initially engaging the lowermost ring 7 in the magazine and thereafter holding the same in position with respect to the holding jaws while the size of the engaged ring is being modified, in this instance contracted, to contract the skirt of the bottle closure 4, the entire construction being such in the preferred embodiment of the invention that the relative positions of the bottle and ring are not materially modified during the time the ring is being contracted, though we do not wish to limit ourselves to this characteristic. The jaws 14 are provided upon the lower ends of six members that are distributed about the vertical axis of the machine, each of these members having a pivotal shaft 15 that is received within depressions in plates 16 and 17 that are clamped into engagement with the pivot shaft 15 by means of screws 18.

Each of the jaw bearing members is desirably formed of symmetrically shaped strips of metal that are held together by means of rivets 19. The pivots 15 upon which the jaws 14 are swingingly mounted are located between said jaws and spring mechanism 20 that spring presses the upper portions of the members carrying said jaws toward the vertical axis of the machine. The upper ends of the members that carry the jaws 14 are desirably provided with rollers 21 between which the inverted cone shaped spreader 2 may be placed for the purpose of forcing the holding jaws 14 inwardly to cause these jaws to contract the fastening elements to any suitable size and shape as, for example, is illustrated in Figs. 3 and 4. The operation of the spreader upon the jaws 14 for the purpose stated is clearly illustrated in Fig. 8.

When the bottle to which the cap has been applied, as illustrated in Fig. 8, is to be withdrawn the spreader 2 is elevated until the spring 20 is permitted to withdraw the jaws 14 to the position shown by dotted lines in Fig. 5 and in full lines in Fig. 1. In this position the rollers 21 engage the shaft 22, having ridden over the sleeve 23 of large diameter and over the tapered lower end of said sleeve in order to engage the shaft 22 and thereby occupy a position in which the jaws 14 are permitted to assume the positions shown in dotted lines in Fig. 5 and in full lines in Fig. 1. The parts are put into the positions illustrated by the dotted lines in Fig. 5 and the full lines in Fig. 1 by effecting the widest separation between the handle 1 and the stem 3 of the spreader 2, which separation of the parts 1 and 3 is accomplished by lifting the spreader as far as it will go, the spreader when nearing the limit of its upward movement engaging the outstanding flange 24 provided at the upper end of the sleeve 23 whereby said sleeve is elevated a sufficient distance from the plate 16 to permit the rollers 21 to fall into engagement with the rod 22 for the purpose which has been described. When the sleeve 23 has been moved a predetermined distance, further movement is prevented by the engagement of the washer 25 with the top of the sleeve 23. When the parts of the machine are in the positions thus described, the machine may be lifted from the bottle by the hand that grips the spreader stem 3. The follower 10 then operates to lower the pile of rings 7 so that a new ring rests upon the composite ledge 5 preparatory to being clamped about the skirted closure placed upon the neck of a new bottle to which the machine is next transferred. Before the machine is applied to the new bottle the spreader 2 is lowered to bring the rollers 21 into engagement with the sleeve 23, thereby to force the jaws 14 into engagement with the now lowermost ring 7, this readjustment being effected by the engagement of the flange 24 of the sleeve 23 with the insetting shoulder 26 at the top of the spreader stem. With the rollers 21 engaging the sleeve 23 and the jaws 14 holding the lowermost ring 7, the machine is transferred to the new bottle whose top is passed through the ring which is firmly held by the jaws 14 to prevent the friction of the bottle cap upon this ring from dislodging it from said jaws. When the follower has been pressed to its upper limiting position by the top of the bottle, the forceful downward movement is imparted to the spreader 2 to cause the parts to occupy the position illustrated in Fig. 8, care being taken in preparing for this forceful downward movement of the spreader 2 not to elevate the spreader to such a position in which the rollers 21 would roll off the cylindrical outer surface of the sleeve 23 for such a movement of the rollers from this cylindrical surface of the sleeve would remove the jaws from holding engagement with the ring. The inner ends of the jaws 14 and the hooks 5, constituting a ring or band support, are so relatively located, and the jaws themselves are of such a size, that these jaws will engage only the lowermost ring within the magazine, the function of the fastening ring or fastening band support being performed independently of the size modifying jaws 14, a part of this function being that of a stop to limit the movement of the fastening band to position it.

We have provided a holder for the rings in the form of a hollow container but we do not wish to be limited to the shape of the magazine and the employment of a hollow magazine within whose interior the fastening rings are disposed. As the invention is embodied the ring contracting elements contract the rings sufficiently to escape the holders 5 therefor, a characteristic which is believed to be novel.

While we have herein shown and particularly described fastening elements in the form of rings whose sizes may be changed by contraction, and have described fastening rings employed for the purpose of holding the skirted portions of bottle closures in position, we do not wish to be limited to the nature of the fastening element nor to the structures to which they are to be applied, as the apparatus of our invention is adapted to a wide variety of uses other than the specific use here illustrated.

While we have shown a type of machine that is purely adapted for the application of fastening rings to the skirted portions of bottle closures, we do not wish to be limited to the precise construction of the machine shown as many changes may be made without departing from the spirit of our invention, and while the machine is shown as being a hand operated machine, it is obviously not essential to the invention that the machine be operated by hand. Reference may be had to our co-pending application Serial No. 608,353, filed February 13, 1911.

While the pressure for causing modification in the size of the fastening elements is shown as being exerted in a direction transverse to the vertical axis of the machine, we do not wish in all embodiments of the invention to be limited to this characteristic.

Having thus described our invention, we claim as new and desire to secure by Letters Patent the following:—

1. Apparatus for modifying the size of fastening elements including means for holding a fastening element that is to have its size modified; mechanism serving to operate upon the aforesaid means to cause said means to modify the size of the fastening element; and a magazine for holding fastening elements and to which magazine the fastening element holding means has access in order to engage and hold a fastening element.

2. Apparatus for modifying the size of fastening elements including means for holding a fastening element that is to have its size modified; mechanism serving to operate upon the aforesaid means to cause said means to modify the size of the fastening element; and a container for fastening elements and coöperatively related to the aforesaid means to supply fastening elements thereto, said container permitting the entry therein of the articles to which the fastening element is thereat to be applied.

3. Apparatus for modifying the size of fastening elements including means for holding a fastening element that is to have its size modified; mechanism serving to operate upon the aforesaid means to cause said means to modify the size of the fastening element; a container for fastening elements and coöperatively related to the aforesaid means to supply fastening elements thereto, said container permitting the entry therein of the articles to which the fastening element is thereat to be applied; and means for forcing the discharge of fastening elements from said container.

4. Apparatus for modifying the size of fastening rings including relatively movable jaws for engaging the rings and modifying their size; mechanism for operating the jaws to cause action thereof upon the rings; and a container for fastening rings and coöperatively related to the aforesaid means to supply fastening rings thereto, said container permitting the entry therein of the articles to which the fastening element is thereat to be applied.

5. Apparatus for modifying the size of fastening rings including relatively movable jaws for engaging the rings and modifying their size; mechanism for operating the jaws to cause action thereof upon the rings; a container for fastening rings and coöperatively related to the aforesaid means to supply fastening rings thereto; said container permitting the entry therein of the articles to which the fastening element is thereat to be applied, and means for forcing the discharge of fastening rings from said container.

6. Apparatus for modifying the size of fastening rings including means for engaging the rings; mechanism for operating the aforesaid means to cause action thereof upon the rings; and a container for fastening rings and coöperatively related to the aforesaid means to supply fastening rings thereto, said container permitting the entry therein of the articles to which the fastening element is thereat to be applied.

7. Apparatus for modifying the size of fastening rings including means for engaging the rings; mechanism for operating the aforesaid means to cause action thereof upon the rings; a container for fastening rings and coöperatively related to the aforesaid means to supply fastening rings thereto, said container permitting the entry therein of the articles to which the fastening element is thereat to be applied; and means for forcing the discharge of fastening rings from said container.

8. Apparatus for modifying the size of fastening elements including means for engaging the elements; mechanism for operating the aforesaid means to cause action thereof upon the elements; and a container for fastening elements and coöperatively related to the aforesaid means to supply fastening elements thereto, said container permitting the entry therein of the articles to which the fastening element is thereat to be applied.

9. Apparatus for modifying the size of fastening elements including means for engaging the elements; mechanism for operating the aforesaid means to cause action thereof upon the elements; a container for fastening elements and coöperatively related to the aforesaid means to supply fastening elements thereto, said container permitting the entry therein of the articles to which the fastening element is thereat to be applied, and means for forcing the discharge of fastening elements from said container.

10. Apparatus for modifying the size of fastening elements including means for holding a fastening element that is to have its size modified; mechanism serving to operate upon the aforesaid means to cause said means to modify the size of the fastening element; and a container for holding fastening elements and to which container the fastening element holding means has access in order to engage and hold a fastening element.

In witness whereof, we hereunto subscribe our names this twelfth day of January A. D., 1911.

OLOF N. TEVANDER.
ARTHUR MANIERRE.

Witnesses:
GEO. C. DAVISON,
G. L. CRAGG.